(12) United States Patent
Cheon

(10) Patent No.: US 10,207,618 B2
(45) Date of Patent: Feb. 19, 2019

(54) MULTI-HARDNESS CUSHION FOR AUTOMOBILE AND MULTI-HARDNESS CUSHION HAVING VENTILATION STRUCTURE

(71) Applicant: DONGKANG HOLDINGS CO., LTD., Gwangju (KR)

(72) Inventor: Woojung Cheon, Gwangju (KR)

(73) Assignee: DAYOU HOLDINGS CO., LTD., Gwangju (KR)

( * ) Notice: Subject to any disclaimer, the term of this patent is extended or adjusted under 35 U.S.C. 154(b) by 194 days.

(21) Appl. No.: 15/313,627

(22) PCT Filed: May 22, 2015

(86) PCT No.: PCT/KR2015/005137
§ 371 (c)(1),
(2) Date: Nov. 23, 2016

(87) PCT Pub. No.: WO2015/178712
PCT Pub. Date: Nov. 26, 2015

(65) Prior Publication Data
US 2017/0210258 A1    Jul. 27, 2017

(30) Foreign Application Priority Data

May 23, 2014   (KR) .................. 10-2014-0061930
May 21, 2015   (KR) .................. 10-2015-0070982

(51) Int. Cl.
*B60N 2/90*   (2018.01)
*B60N 2/56*   (2006.01)
(Continued)

(52) U.S. Cl.
CPC ............... *B60N 2/90* (2018.02); *B60N 2/56* (2013.01); *B60N 2/5642* (2013.01); *B60N 2/646* (2013.01); *B60N 2/7005* (2013.01)

(58) Field of Classification Search
None
See application file for complete search history.

(56) References Cited

U.S. PATENT DOCUMENTS 3,736,022 A * 5/1973 Radke ................. B60N 2/56
                                                  297/452.43
5,544,942 A * 8/1996 Vu Khac ............. A47C 7/18
                                                  297/452.27
(Continued)

FOREIGN PATENT DOCUMENTS

FR         2882308 A1 *  8/2006   ......... B29C 44/1261

*Primary Examiner* — David E Allred
(74) *Attorney, Agent, or Firm* — NSIP Law

(57) ABSTRACT

Disclosed herein is a multi-hardness cushion having a ventilation structure. This includes a support cushion having an insert recess, and stepped portions formed on both sides of the insert recess; a friction cushion detachably provided in the insert recess and having locking parts locked to the stepped portions; a first ventilation unit having a first air flow channel provided in the insert recess, a plurality of first side flow channels provided in the stepped portions, and an air inlet opening provided in the first air flow channel; and a second ventilation unit having a second air flow channel formed in the friction cushion to face the first air flow channel, a plurality of second air flow holes formed along the second air flow channel to penetrate the friction cushion, and a plurality of second side flow holes formed in the locking parts.

5 Claims, 11 Drawing Sheets

(51) Int. Cl.
*B60N 2/64* (2006.01)
*B60N 2/70* (2006.01)

(56) References Cited

U.S. PATENT DOCUMENTS

| | | | | |
|---|---|---|---|---|
| 7,478,869 B2* | 1/2009 | Lazanja | ............... | B60N 2/5635 |
| | | | | 297/180.13 |
| 2002/0067058 A1* | 6/2002 | Pfahler | ................. | A47C 7/744 |
| | | | | 297/180.11 |
| 2008/0315634 A1* | 12/2008 | Hartmann | ............ | B60N 2/5635 |
| | | | | 297/180.14 |
| 2009/0079236 A1* | 3/2009 | Itou | ..................... | B60N 2/5635 |
| | | | | 297/180.1 |
| 2010/0045079 A1* | 2/2010 | Andersson | ........... | B60N 2/5642 |
| | | | | 297/180.14 |
| 2011/0109127 A1* | 5/2011 | Park | ..................... | B60N 2/5642 |
| | | | | 297/180.1 |
| 2011/0169319 A1* | 7/2011 | Demontis | ........... | B60N 2/5664 |
| | | | | 297/452.46 |
| 2012/0256450 A1* | 10/2012 | Sahashi | ................ | B60N 2/5635 |
| | | | | 297/180.14 |
| 2012/0315132 A1* | 12/2012 | Axakov | ............... | B60N 2/5635 |
| | | | | 415/182.1 |
| 2015/0274048 A1* | 10/2015 | Mogi | .................. | B60N 2/5642 |
| | | | | 297/452.48 |
| 2016/0250905 A1* | 9/2016 | Tanaka | ............... | B60H 1/00285 |
| | | | | 454/75 |
| 2017/0043695 A1* | 2/2017 | Kitamoto | ................. | B60N 2/90 |

* cited by examiner (a)

(b)

MULTI-HARDNESS CUSHION FOR AUTOMOBILE AND MULTI-HARDNESS CUSHION HAVING VENTILATION STRUCTURE

CROSS-REFERENCE TO RELATED APPLICATIONS

This application claims the benefit under 35 USC 119(a) of PCT Application No. PCT/KR2015/005137, filed on May 22, 2015, which claims the benefit of Korean Patent Application Nos. 10-2014-0061930 filed May 23, 2014 and 10-2015-0070982 filed May 21, 2015, in the Korean Intellectual Property Office, the entire disclosure of which is incorporated herein by reference for all purposes.

TECHNICAL FIELD

The present invention relates to a multi-hardness cushion for a vehicle and a multi-hardness cushion having a ventilation structure. More particularly, the present invention relates to a multi-hardness cushion for a vehicle and a multi-hardness cushion having a ventilation structure, in which a support cushion and a friction cushion having different hardnesses are detachably implemented in the form of a block, thus considerably reducing a defective proportion in comparison with an existing multi-hardness cushion, minimizing replacement cost due to damage, and allowing an entire area of cushion on which a passenger is seated to be evenly ventilated.

BACKGROUND ART

Recently, as the quality of life is improved, the use of a vehicle has rapidly increased for the purpose of travel or leisure as well as for commuting. Thus, as the time a person stays in a vehicle has increased, a vehicle seat is required to be comfortable.

A vehicle seat is mainly composed of a rigid frame for bearing shocks, and a seat cover. More particularly, the rigid frame is made by expanding urethane resin and then is covered with the seat cover made of leather, fabric or the like. Further, a shock absorbing cushion is additionally provided if necessary.

Thus, the cushion applied to the vehicle seat is generally formed to have a low hardness. However, recently, the use of a dual-hardness cushion is growing rapidly. Specifically, the dual-hardness cushion is made by combining a soft layer and a hard layer having different hardnesses. Here, the soft layer provides passenger comfort, while the hard layer guarantees durability.

However, such a dual-hardness cushion is problematic in that the soft layer and the hard layer are manufactured using the same mold, so that a defective proportion is increased in a production process, and it is complicated to manufacture the cushion, so that productivity is low and damage to the manufactured dual-hardness cushion makes it impossible to reuse the cushion, so that high replacement cost is incurred.

Meanwhile, in summer, heat is directly transmitted from the vehicle seat to a passenger, so that a body part contacting the seat gets wet with perspiration or moisture and thereby the passenger feels uncomfortable.

FIG. 1 illustrates a conventional ventilation structure for a vehicle seat to solve the above-described problems. A second air flow hole 1a is formed in a seat cushion 1 to guide air to an upper portion of the seat, and a ventilation mat 2 is mounted on a bottom of the seat cushion 1 to communicate with the second air flow hole 1a, and a blower unit 5 having a blower fan and a motor is mounted under the seat to cause air to blow into the ventilation mat 2.

However, the conventional ventilation structure is problematic in that the ventilation mat is produced through injection molding to have a predetermined thickness, so that this results in reducing the thickness of the seat cushion, and thereby considerably deteriorates the comfort of a passenger sitting in the seat.

Further, the blower unit is individually provided on a seat cushion side and a seat back side, respectively, so that the cost and weight of a ventilation device are undesirably increased, and the blower fan causes irritation when a passenger is seated, thus degrading his or her comfort.

DISCLOSURE

Technical Problem

Accordingly, the present invention has been made keeping in mind the above problems occurring in the related art, and is intended to provide a multi-hardness cushion for a vehicle, in which a support cushion and a friction cushion having different hardnesses are detachably implemented in the form of a block, thus considerably reducing a defective proportion in comparison with an existing multi-hardness cushion and minimizing replacement cost due to damage.

Another object of the invention is to provide a multi-hardness cushion having a ventilation structure that is capable of evenly circulating air through a seating surface of a friction cushion on which a passenger is seated and both sides thereof.

A further object of the invention is to provide a multi-hardness cushion having a ventilation structure that is capable of more smoothly removing perspiration from a passenger's body part contacting a seat and thereby preventing moisture from being generated, thus increasing passenger comfort.

Technical Solution

In an aspect, the present invention provides a multi-hardness cushion including a support cushion provided in a form of a vehicle seat, the cushion having an insert recess formed in a portion where a passenger's buttocks are placed when he or she is seated, stepped portions formed on both sides of the insert recess, and guide parts provided on both sides of the stepped portions to guide both sides of the passenger's buttocks and thighs when he or she is seated; and a friction cushion detachably provided in the insert recess of the support cushion so that the passenger's buttocks are placed thereon when he or she is seated, and made of a material that is lower in hardness than the support cushion, and having on both sides thereof locking parts that are locked to the stepped portions.

In a preferred embodiment, a magnetic member having magnetic properties may be provided on an outer circumferential surface of a lower portion of the friction cushion, and a contact member of a metal material may be provided on an outer circumferential surface of the support cushion to be in contact with the magnetic member.

In another preferred embodiment, a net-shaped first mesh member accommodating the magnetic member therein may be attached to the friction cushion, and a net-shaped second mesh member accommodating the contact member therein may be attached to the support cushion.

In still another preferred embodiment, the multi-hardness cushion may further include a shock absorbing cushion composed of a synthetic-resin foam molded product in a form of a cushion that is detachably attached to a lower surface of the friction cushion, and having an eggbox panel-shaped uneven part to form an air layer on the lower surface.

In yet another preferred embodiment, a plurality of first air flow holes may be perforated through the friction cushion and a plurality of second air flow holes may be perforated through the shock absorbing cushion to allow air in the air layer and external air to flow to outer surfaces of the friction cushion and the shock absorbing cushion.

In another aspect, the present invention provides a multi-hardness cushion having a ventilation structure, including a support cushion provided in a form of a vehicle seat and having an insert recess formed in a portion where a passenger's buttocks are placed when he or she is seated, with stepped portions being formed on both sides of the insert recess; a friction cushion detachably provided in the insert recess of the support cushion so that the passenger's buttocks are placed thereon when he or she is seated, and having a locking part that is locked to each of the stepped portions; a first ventilation unit having a first air flow channel provided in the insert recess, a plurality of first side flow channels provided in each of the stepped portions, and an air inlet opening provided in the first air flow channel; and a second ventilation unit having a second air flow channel that is formed in the friction cushion to face the first air flow channel, a plurality of second air flow holes that are formed along the second air flow channel to penetrate the friction cushion, and a plurality of second side flow holes formed in each of the locking parts to communicate with the plurality of first side flow channels, wherein air introduced into the air inlet opening passes through a central portion of the friction cushion via the plurality of second air flow holes while flowing through the first and second air flow channels, and ventilates the seat while passing through both sides of the friction cushion via the plurality of first side flow channels and the plurality of second side flow holes.

In a preferred embodiment, the first air flow channel may be formed with a geometric structure in the insert recess on a front of the support cushion, and the second air flow channel may be formed with a geometric structure on a rear of the friction cushion, and when the support cushion may be coupled with the friction cushion, the first and second air flow channels may define an air flow path through which air introduced into the air inlet opening flows.

In another preferred embodiment, the multi-hardness cushion may further include an elastic air pipe installed in the first air flow channel, and the elastic air pipe may prevent a gap between the first and second air flow channels from becoming narrow due to pressing of the friction cushion by a passenger's load when he or she is seated.

In still another preferred embodiment, the first and second air flow channels may be subjected to mold block coating to cause the front of the support cushion and the rear of the friction cushion to be smooth, thus allowing air to smoothly flow through the first and second air flow channels.

In yet another preferred embodiment, the multi-hardness cushion may further include a seating detection sensor provided between the support cushion and the friction cushion to detect whether the passenger is seated, and the seating detection sensor may have a structure to prevent the flow of air introduced through the air inlet opening into the first and second air flow channels from being blocked.

Advantageous Effects

As described above, the present invention provides a structure where a support cushion and a friction cushion are detachably implemented in the form of a block, thus considerably reducing a defective proportion in comparison with an existing multi-hardness cushion where a support cushion and a friction cushion are integrated with each other, and minimizing replacement cost due to damage.

Further, a support cushion and a friction cushion are detachably attached by a magnetic member using magnetic properties and a contact member, thus permitting a rapid operation and thereby enabling a multi-hardness cushion to be semi-permanently used, in addition to ensuring excellent functionality.

Furthermore, an uneven surface formed on a shock absorbing cushion absorbs remaining shocks that are not absorbed by a friction cushion, and a resonance space is formed by an air layer, thus remarkably reducing and distributing transmitted vibration, allowing a shock absorbing operation to be efficiently performed, and consequently providing a multi-hardness cushion of a good quality.

The present invention circulates air in a seating surface of a friction cushion on which a passenger is seated, and in both sides of the friction cushion through a plurality of second side guide holes, thus allowing air to evenly flow throughout an entire area of the friction cushion, and consequently increasing the ventilation efficiency of the friction cushion.

Further, the present invention has an elastic air pipe installed between first and second air flow channels, thus preventing a friction cushion from being pressed by an elastic restoring force of the elastic air pipe, and preventing a gap of an air flow path from becoming narrow when a passenger is seated, thus improving the ventilation efficiency of a vehicle seat.

Furthermore, the present invention more smoothly removes perspiration from a passenger's body part contacting a seat, and prevents moisture from being generated, thus increasing passenger comfort.

BEST MODE

Hereinafter, a multi-hardness cushion for a vehicle and a multi-hardness cushion having a ventilation structure according to preferred embodiments of the present invention will be described with reference to the accompanying drawings.

First, the multi-hardness cushion for the vehicle according to the preferred embodiment of the present invention will be described below with reference to FIGS. 2 to 8.

Figure 1:
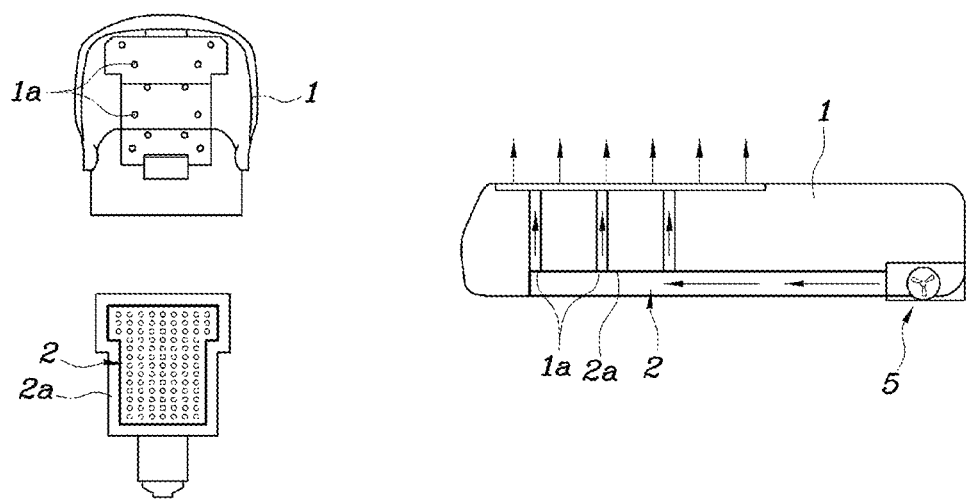
FIG. 1 is a view schematically illustrating a conventional structure of a vehicle seat equipped with a ventilation mat.
Figure 2:
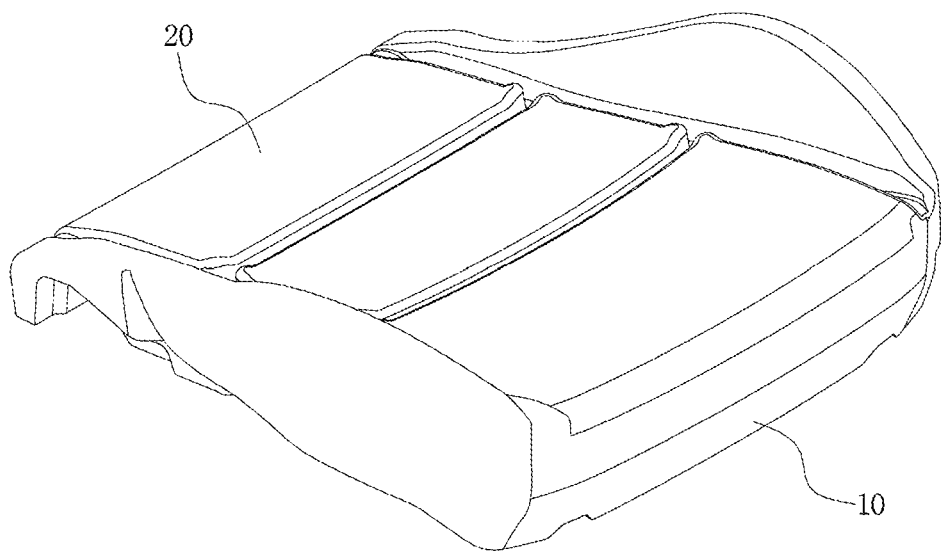
FIGS. 2, 3 and 4 are views illustrating the shape of a multi-hardness cushion for a vehicle according to preferred embodiments of the present invention.
Figure 3:
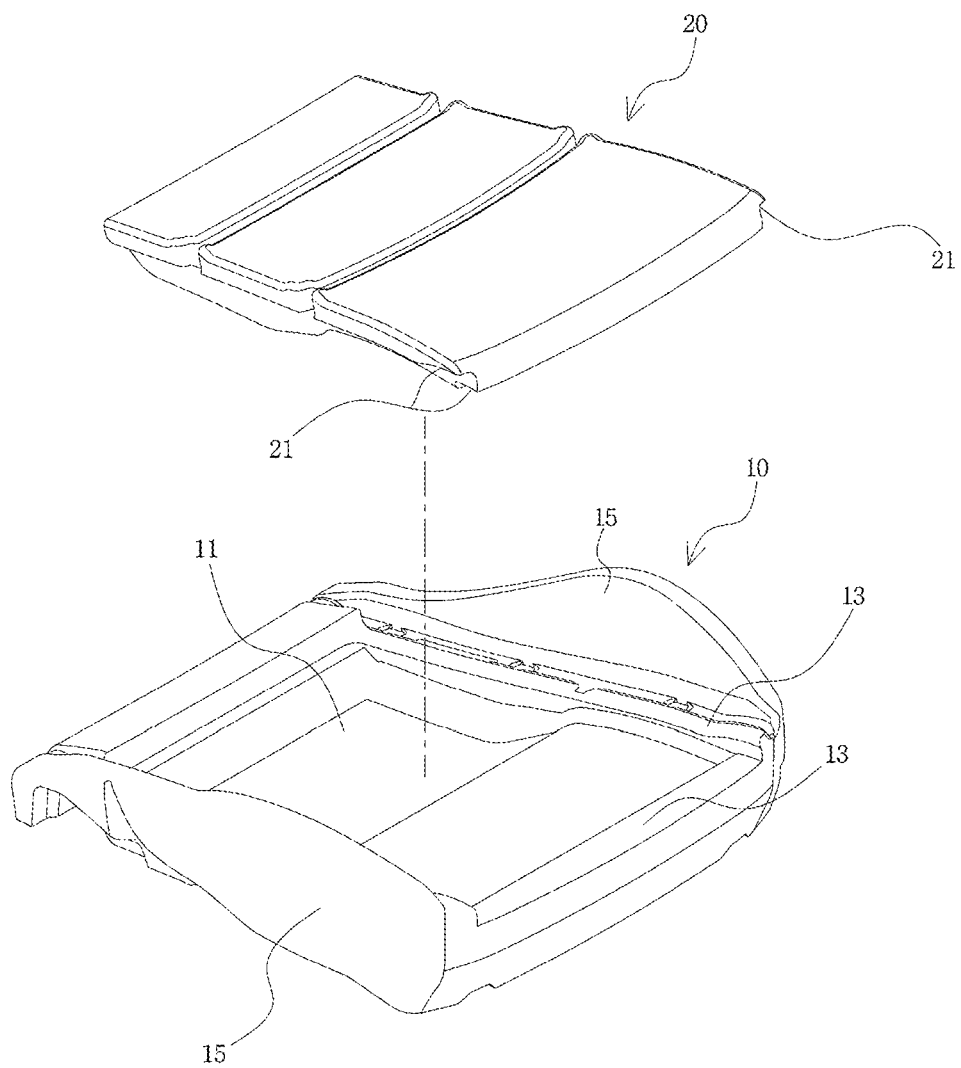
Figure 4:
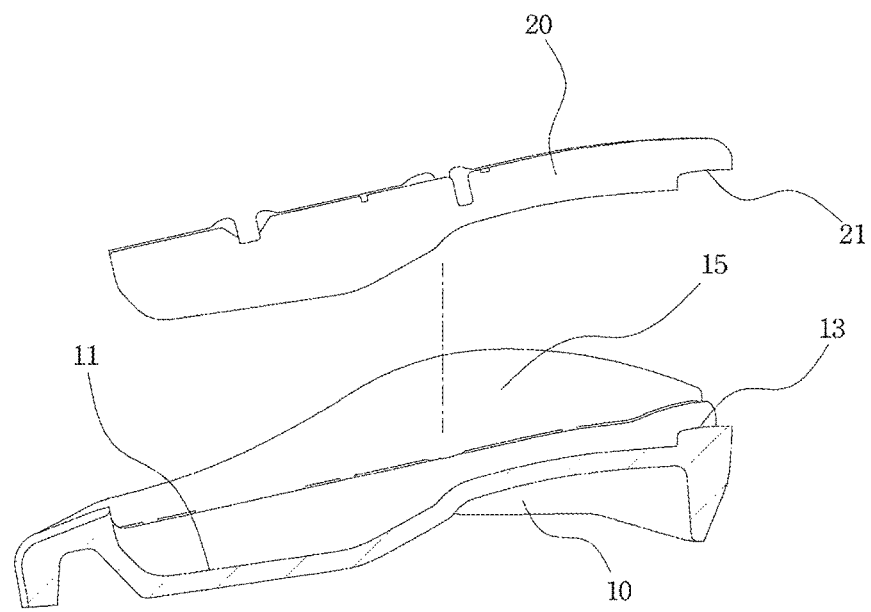

FIGS. 2, 3 and 4 are views illustrating preferred shapes of the present invention. The multi-hardness cushion for the vehicle according to the present invention is configured such that a support cushion 10 and a friction cushion 20 having different hardnesses are detachably attached thereto.

The support cushion 10 is provided in the form of a vehicle seat and has an insert recess 11 in a portion where a passenger's buttocks are placed when he or she is seated, such that the friction cushion 20 that will be described later is detachably attached thereto.

Stepped portions 13 are formed on both sides of the insert recess 11 that is defined in the support cushion 10, thus increasing a coupling force when the friction cushion 20 is inserted and thereby providing a robust structure.

Further, guide parts 15 are provided on both sides of the support cushion 10 to guide both sides of the passenger's buttocks and thighs when he or she is seated, thus increasing a support force for both sides the passenger's buttocks and thighs, and thereby improving stability for a passenger and improving the durability for the overall support cushion 10.

Figure 5:
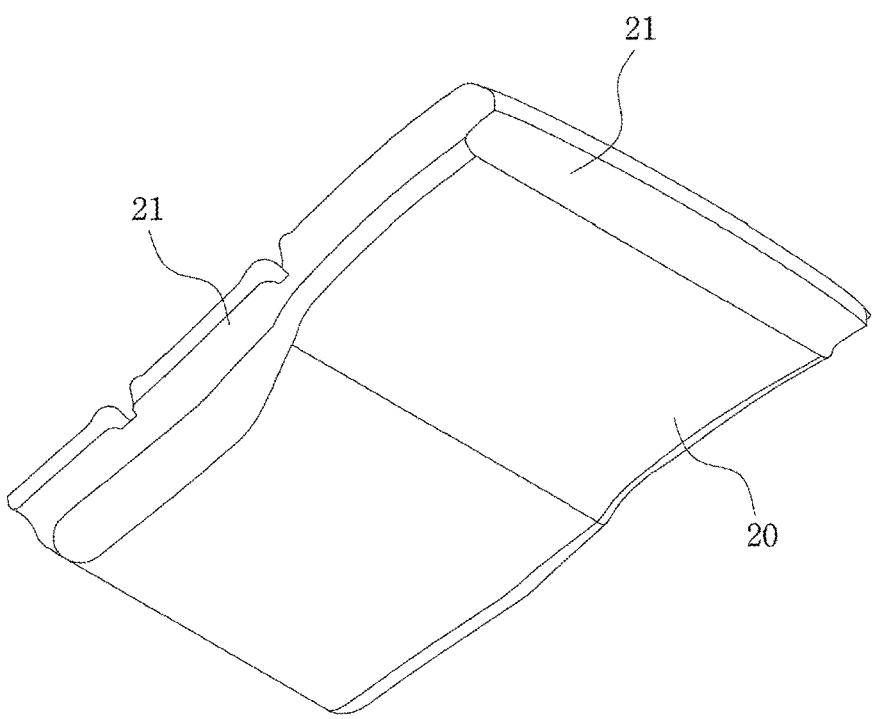
FIG. 5 is a view illustrating a preferred shape of a friction cushion in a multi-hardness cushion for a vehicle according to a preferred embodiment of the present invention.

As illustrated in FIG. 5, the friction cushion 20 is detachably inserted into the insert recess 11 of the support cushion 10 to allow the passenger's buttocks to be placed thereon when he or she is seated, and is made of a material that is lower in hardness than the support cushion 20.

That is, the hardness of the friction cushion 20 contacting a passenger is lower than that of the support cushion 10, thus enhancing passenger comfort. The support cushion 10 supporting the friction cushion 20 is higher in hardness than the friction cushion 20, thus increasing the durability of the multi-hardness cushion.

Figure 6:
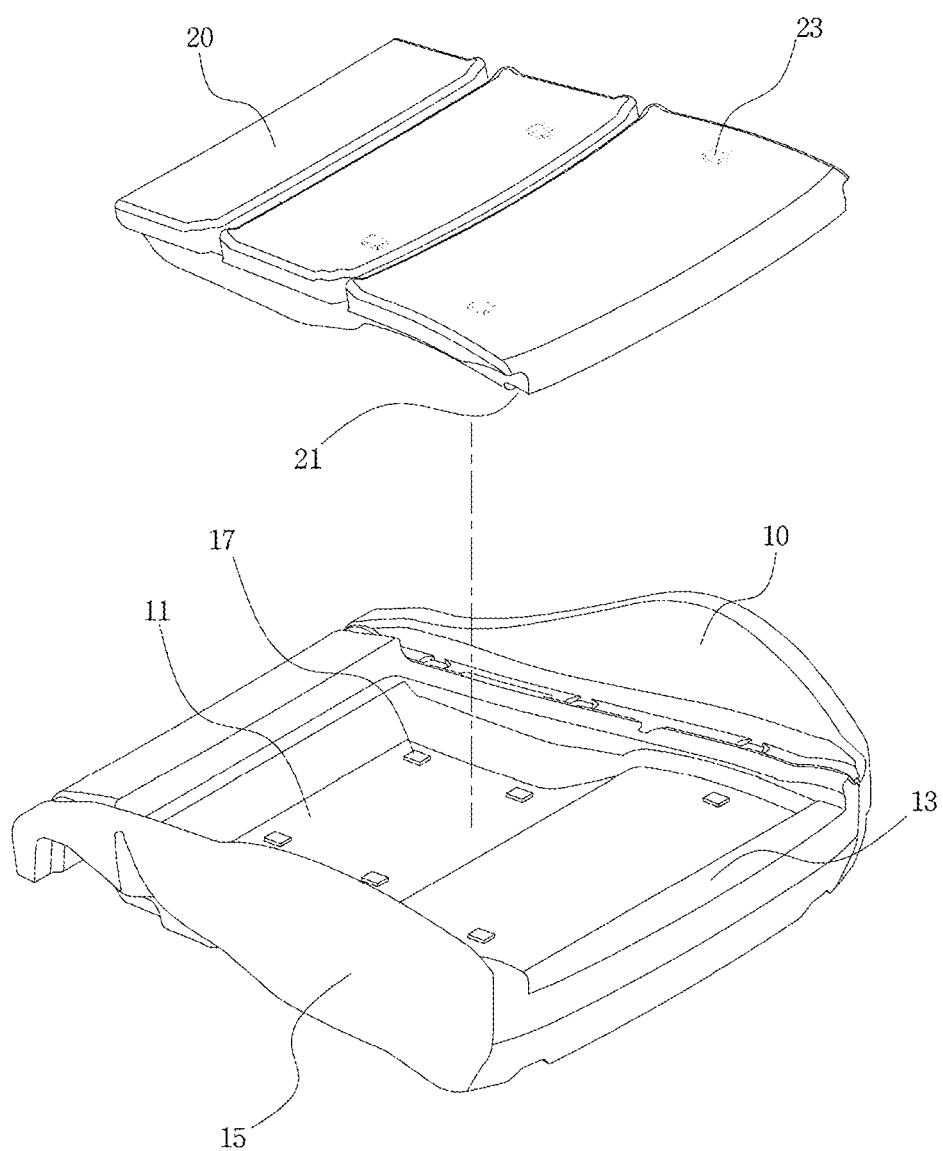
FIGS. 6 and 7 are views illustrating various preferred shapes of a magnetic member and a contact member in the multi-hardness cushion for the vehicle according to the preferred embodiment of the present invention.
Figure 7:
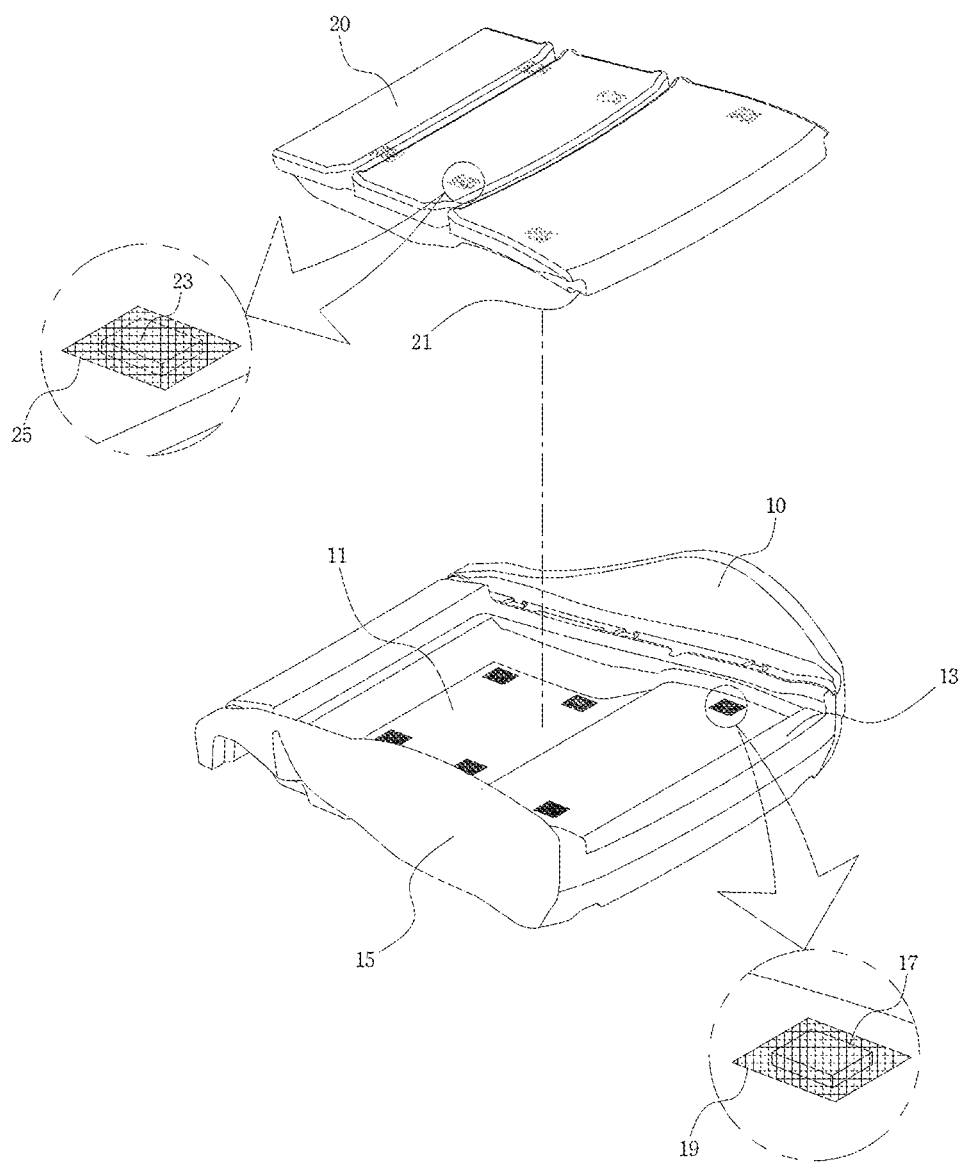
Figure 8:
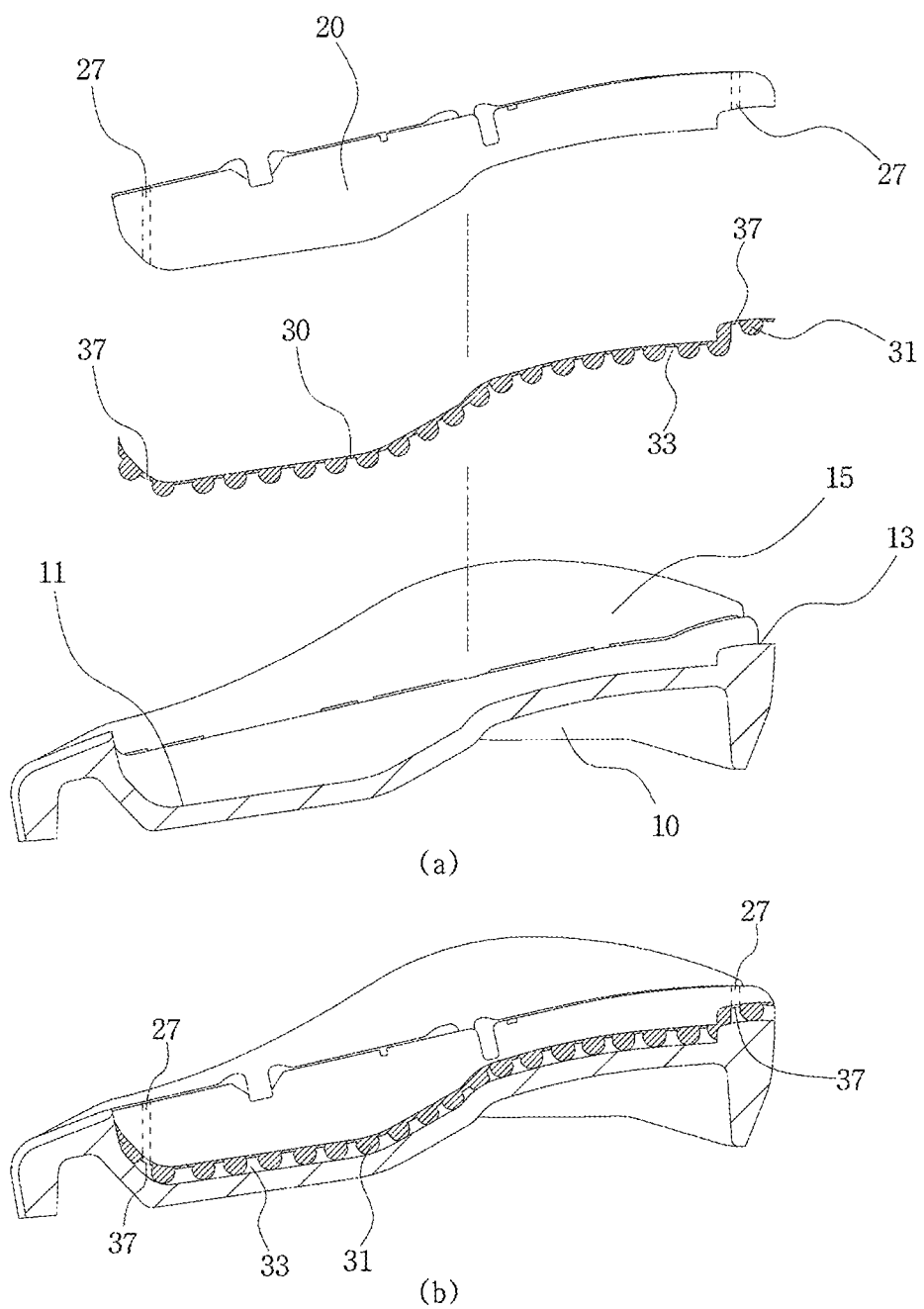
FIGS. 8A and 8B are views schematically illustrating preferred shapes of a shock absorbing cushion in the multi-hardness cushion for the vehicle according to the preferred embodiment of the present invention.
Figure 9:
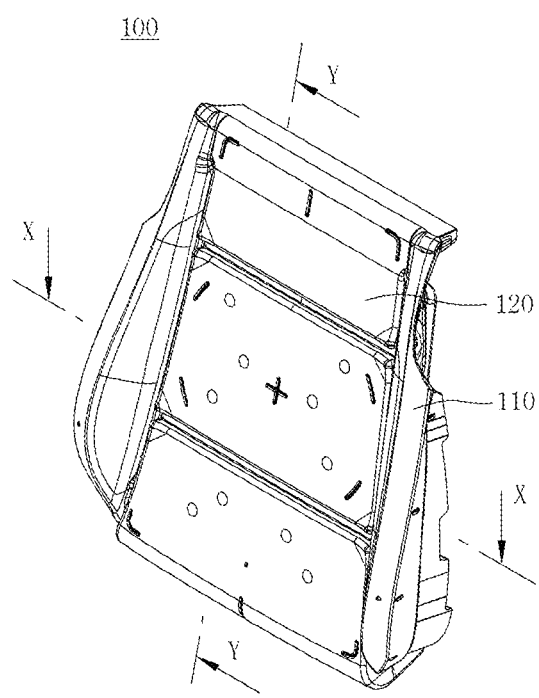
FIG. 9 is a perspective view schematically illustrating an assembled state of a multi-hardness cushion having a ventilation structure according to an embodiment of the present invention.

As illustrated in FIGS. 6 and 7, the friction cushion 20 may have a structure obtained by connecting three blocks with each other. It is apparent to those skilled in the art that the blocked structure of the friction cushion 20 will be a dual-block connecting structure or a multi-block connecting structure. Meanwhile, in the friction cushion 20 illustrated in this embodiment, only a structure (see FIG. 6) that has no bolster and is inserted into the insert recess 11 of the support cushion 10 is disclosed. However, the friction cushion may have a structure (see FIG. 10) in which bolsters extend from both sides of the friction cushion and partially come into contact with the guide parts 115 of the support cushion, or a structure (not shown) in which bolsters extending from both sides of the friction cushion completely come into contact with the guide parts of the support cushion.

Further, the friction cushion 20 has on both sides thereof locking parts 21 that are locked to the stepped portions 13, thus implementing the insert recess 11, the support cushion 10 and the friction cushion 20 in the form of a block, and thereby increasing a coupling force with the support cushion 10, in addition to facilitating attachment and detachment.

Therefore, the support cushion 10 and the friction cushion 20 of the multi-hardness cushion according to the present invention are separately manufactured and are detachably combined in the form of a block, thus considerably reducing a defective proportion in comparison with an existing multi-hardness cushion where a support cushion and a friction cushion are integrated with each other. Further, the multi-hardness cushion is separated into the support cushion 10 and the friction cushion 20, so that the multi-hardness cushion may be continuously used simply by replacing only the damaged cushion with a new one when either of the support cushion 10 and the friction cushion 20 is damaged, thus minimizing replacement cost due to damage.

Meanwhile, as illustrated in FIG. 6, a magnetic member 23 having magnetic properties is provided on an outer circumferential surface of a lower portion of the friction cushion 20, and a contact member 17 of a metal material is provided on an outer circumferential surface of the support cushion 10 to be in contact with the magnetic member 23.

That is, the friction cushion 20 and the support cushion 10 include the magnetic member 23 having magnetic properties and the contact member 17, respectively, thus allowing the friction cushion 20 to be rapidly detachably attached to the support cushion 10 and thereby enabling the multi-hardness cushion to be semi-permanently used in terms of the feature of the magnetic member 23, in addition to ensuring an excellent functionality.

In order to create a fixing force between the friction cushion 20 and the support cushion 10, the magnetic member 23 is preferably made of a neodymium magnet having a high magnetic force.

As illustrated in FIG. 7, a net-shaped first mesh member 25 accommodating the magnetic member 23 therein is attached to the outer circumferential surface of the lower portion of the friction cushion 20, and a net-shaped second mesh member 19 accommodating the contact member 17 therein is attached to the outer circumferential surface of the support cushion 10.

That is, the first and second mesh members 25 and 19 allow the magnetic member 23 and the contact member 17 to be safely fixed to the friction cushion 20 and the support cushion 10, in addition to allowing the friction cushion 20 to be easily attached to or detached from the support cushion 10. Here, the support cushion 10 has a high hardness, while the friction cushion 20 has a low hardness.

As illustrated in FIGS. 8A and 8B, a shock absorbing cushion 30 is further provided between the friction cushion 20 and the support cushion 10 to distribute load generated by a passenger and thereby provide passenger comfort.

The shock absorbing cushion 30 is composed of a synthetic-resin foam molded product in a form of a cushion that is detachably attached to a lower surface of the friction cushion 20, and has an eggbox panel-shaped uneven part 31 to form an air layer 33 on the lower surface. The shock absorbing cushion 30 may be different in hardness than the support cushion 10 and the friction cushion 20. For instance, the shock absorbing cushion may have a hardness that is lower than that of the support cushion 10 and is higher than that of the friction cushion 20.

That is, the load generated by a passenger is absorbed by the friction cushion 20, remaining shocks are diffused and absorbed by the uneven part 31 formed on the shock absorbing cushion 30, and transmitted vibration is remarkably reduced and distributed by the resonance space that is defined by the air layer 33 formed by the uneven part 31 of the shock absorbing cushion 30, so that shocks are efficiently absorbed and a contact area with the support cushion 10 is minimized due to the uneven part 31. Consequently, vibration transmitted to the support cushion 10 is minimized and the efficient shock absorbing operation is realized.

In order to allow air circulating in the air layer and external air to flow to outer surfaces of the friction cushion 20 and the shock absorbing cushion 30, a plurality of perforated first air flow holes 27 and a plurality of perforated second air flow holes 37 are formed, respectively, to discharge the air circulating in the air layer 33 of the shock absorbing cushion 30 to the outside. Consequently, the shock absorbing effect is maximized and the external air is supplied to a passenger's body part that is in close contact with the friction cushion 20, thus ensuring passenger comfort.

Hereinafter, a multi-hardness cushion having a ventilation structure according to a preferred embodiment of the present invention will be described with reference to FIGS. 9 to 14.

As illustrated in FIGS. 9 to 13, the multi-hardness cushion 100 having the ventilation structure according to the embodiment of the present invention includes a support cushion 110, a friction cushion 120, a first ventilation unit 130, a second ventilation unit 140, an elastic air pipe 150, a seating detection sensor 170 and a heater unit 180. The present invention is intended to evenly ventilate an entire area of the friction cushion 120 on which a passenger is seated.

Figure 10:
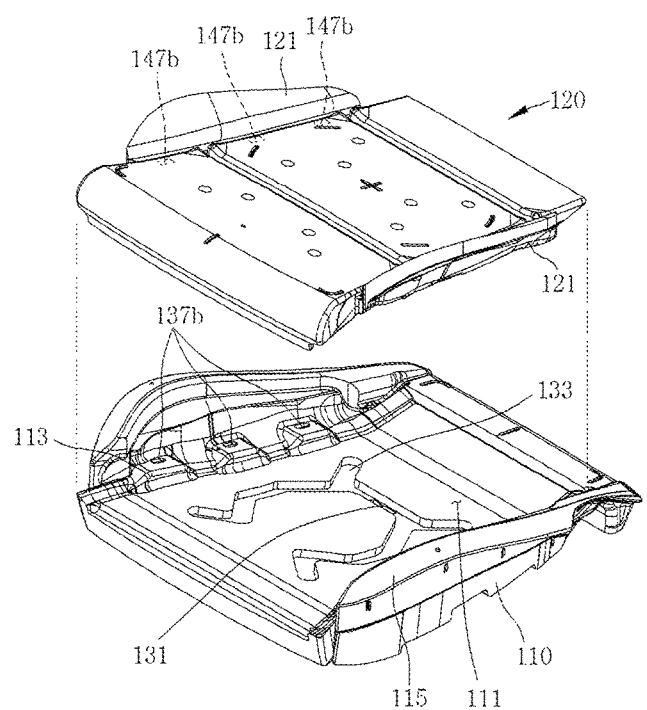
FIG. 10 is an exploded perspective view schematically illustrating the multi-hardness cushion having the ventilation structure according to the embodiment of the present invention.
Figure 11:
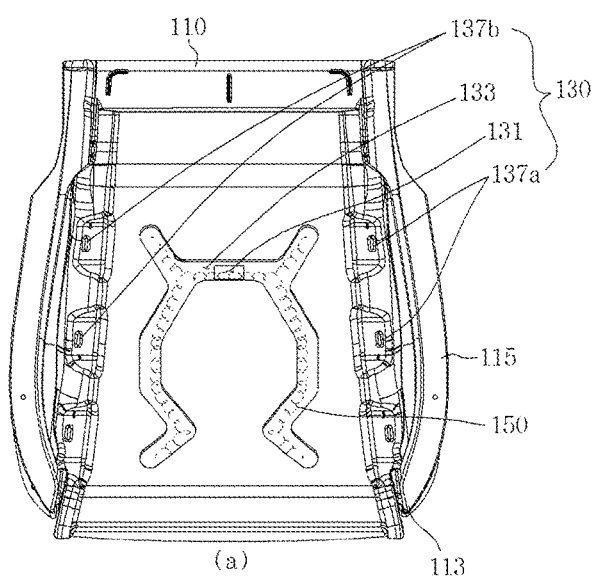
FIG. 11A is a perspective view schematically illustrating a support cushion having a first ventilation unit.
FIG. 11B is a perspective view schematically illustrating a friction cushion having a second ventilation unit.
Figure 11:
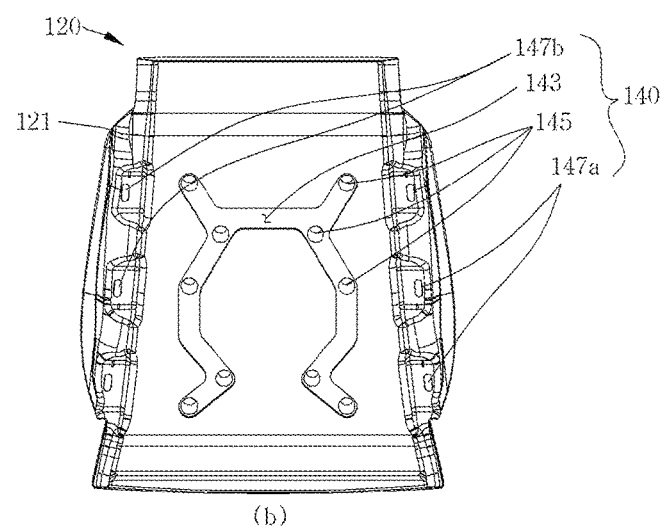

As illustrated in FIGS. 10 and 11A, the support cushion 110 is provided in the form of a vehicle seat and has an insert recess 111 in a portion where a passenger's buttocks are placed when he or she is seated, such that the friction cushion 120 that will be described later is detachably attached thereto.

As illustrated in FIG. 11A, stepped portions 113 are formed on both sides of the insert recess 111 that is defined in the support cushion 110, thus increasing a coupling force when the friction cushion 120 is inserted and thereby providing a robust structure.

Further, guide parts 115 are provided on both sides of the support cushion 110 to guide both sides of the passenger's buttocks and thighs when he or she is seated, thus increasing a support force for both sides of the passenger's buttocks and thighs, and thereby improving stability for a passenger and improving the durability for the overall support cushion 110.

As illustrated in FIG. 11B, the friction cushion 120 is detachably inserted into the insert recess 111 of the support cushion 110 to allow the passenger's buttocks to be placed thereon when he or she is seated.

The friction cushion 120 is made of a material that is lower in hardness than the support cushion 120. That is, the hardness of the friction cushion 120 contacting a passenger is lower than that of the support cushion 110, thus enhancing passenger comfort. The support cushion 110 supporting the friction cushion 120 is higher in hardness than the friction cushion 120, thus increasing the durability of the multi-hardness cushion.

The friction cushion 120 may be formed of a structure having a plurality of blocks. In this embodiment, the friction cushion 120 has three blocks. However, without being limited thereto, it is apparent to those skilled in the art that the friction cushion may be formed of a structure having two or three blocks.

In addition, the respective blocks of the friction cushion 120 may have different hardnesses. For instance, a block contacting the legs may be made of a soft material, and a block contacting the buttocks may be made of a material that is higher in hardness than the block contacting the legs.

Thus, the present invention allows the structure of the friction cushion 120 to be diversified through a multi-block connecting structure, thus changing the structure of a vehicle seat to meet a consumer demands and thereby realizing consumer satisfaction.

Further, locking parts 121 are formed on both sides of the friction cushion 120, thus implementing the insert recess 111, the support cushion 110 and the friction cushion 120 in the form of a block and thereby increasing a coupling force with the support cushion 110, in addition to facilitating attachment and detachment. The locking parts 121 are locked to the stepped portions 113 of the support cushion.

Therefore, the support cushion 110 and the friction cushion 120 according to the present invention are separately manufactured and are detachably combined in the form of a block, thus considerably reducing a defective proportion in comparison with an existing multi-hardness cushion where a support cushion 110 and a friction cushion 120 are integrated with each other. Further, the multi-hardness cushion is separated into the support cushion 110 and the friction cushion 120, so that the multi-hardness cushion may be continuously used simply by replacing only the damaged cushion with a new one when either of the support cushion 110 and the friction cushion 120 is damaged, thus minimizing replacement cost due to damage.

Meanwhile, a heater unit 180 is provided on a front of the friction cushion 120. A second ventilation unit 140 is provided on a rear of the friction cushion 120. The heater unit 180 serves to transfer heat to a passenger when he or she is seated. The heater unit 180 is preferably configured to prevent the second ventilation unit 140 from being blocked, thus allowing air to smoothly flow through the second ventilation unit 140 to the friction cushion 120.

Hereinafter, the first ventilation unit 130 provided on the support cushion 110 and the second ventilation unit 140 provided on the friction cushion 120 will be described.

As illustrated in FIGS. 10 to 13, the first ventilation unit 130 is formed in the support cushion 110. Here, the first ventilation unit 130 includes an air inlet opening 131, a first air flow channel 133, and a plurality of first side flow channels 137a and 137b.

As illustrated in FIG. 11A, the air inlet opening 131 is located in the first air flow channel 133 and is formed to penetrate the support cushion 110. The air inlet opening 131 is an opening into which air is introduced.

Figure 13:
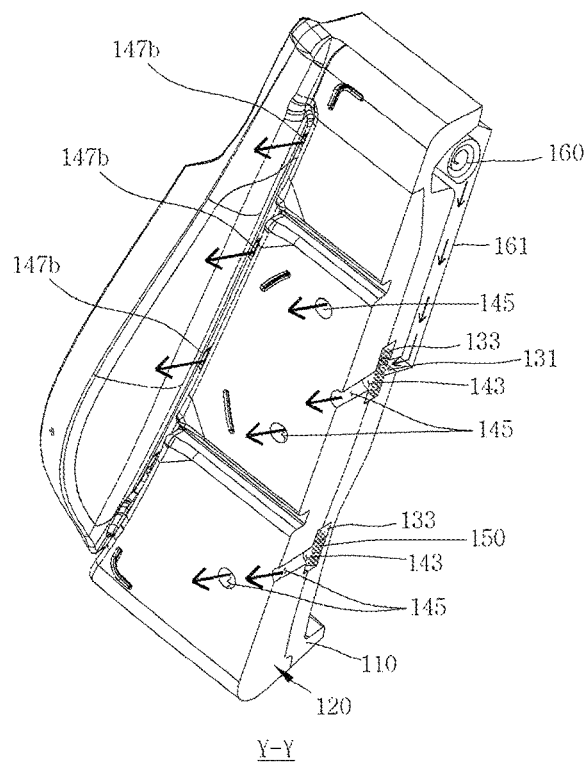
FIG. 13 is a schematic sectional view taken along line Y-Y of FIG. 9.

As illustrated in FIG. 13, a blowing unit 160 is connected to the air inlet opening 131. Here, the air inlet opening 131 and the blowing unit 160 are connected to each other by a duct 161. Air discharged out from the blowing unit 160 is supplied along the duct 161 to the air inlet opening 131.

As illustrated in FIGS. 10 and 11A, the first air flow channel 133 is provided in a surface of the support cushion 110 in which the insert recess 111 is formed. The first air flow channel 133 is a path through which air introduced into the air inlet opening 131 flows. Here, the first air flow channel 133 is a groove having a geometric structure.

Preferably, the first air flow channel 133 is formed throughout the entire insert recess 111.

Figure 12:
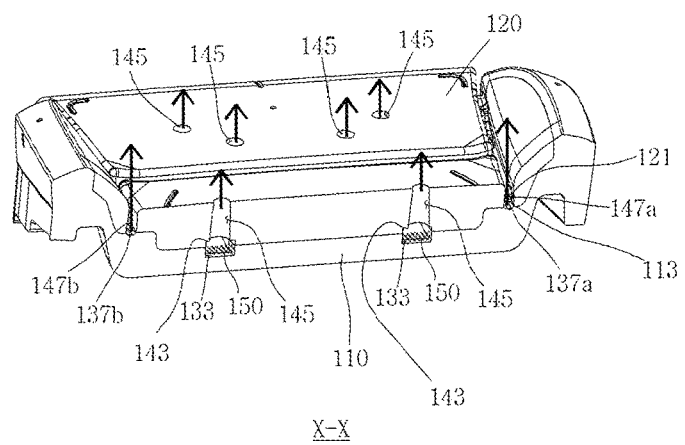
FIG. 12 is a schematic sectional view taken along line X-X of FIG. 9.

As illustrated in FIGS. 11A and 12, a plurality of first side flow channels 137a and 137b is provided on the stepped portions on the support cushion 110. The plurality of first side flow channels 137a and 137b is provided on the stepped portions 113 that are spaced apart from both edges of the insert recess 111.

For the convenience of description, in this embodiment, the first side flow channel 137a or 137b formed to be adjacent to one edge of the insert recess 111 is referred to as a '1a side flow channel 137a', while the first side flow channel 137a or 137b formed to be adjacent to the other edge of the insert recess 111 is referred to as a '1b side flow channel 137b'.

In this embodiment, a plurality of 1a side flow channels 137a is arranged in a row on a stepped portion provided on one side of the support cushion 110 to be spaced apart from each other by a predetermined distance. A plurality of 1b side flow channels 137b is arranged in a row on a stepped portion 113 provided on the other side of the support cushion 110 to be spaced apart from each other by a predetermined distance.

The above-described first air flow channel 133 is provided between the plurality of 1a side flow channels 137a and the plurality of 1b side flow channels 137b. Air introduced through the air inlet opening 131 into the first air flow channel 133 flows in the 1a side flow channels 137a and the 1b side flow channels 137b.

Meanwhile, as illustrated in FIG. 11B, the second ventilation unit 140 is formed in the friction cushion 120. The second ventilation unit 140 includes a second air flow channel 143, a plurality of second air flow holes 145, and a plurality of second side flow holes 147a and 147b.

The second air flow channel 143 is formed in a rear of the friction cushion 120 to face the first air flow channel 133. The second air flow channel 143 has a geometric structure corresponding to the first air flow channel 133.

When the support cushion 110 and the friction cushion 120 are combined with each other, an air flow path is defined between the second air flow channel 143 and the first air flow channel 133 to allow air introduced into the air inlet opening 131 to flow therethrough. The second air flow channel 143 configured as such enables air to be evenly circulated throughout the entire area of the friction cushion 120.

In order to keep the gap of the air flow path constant in the multi-hardness cushion 100 having the ventilation structure according to this embodiment, as illustrated in FIG. 11A, an elastic air pipe 150 is installed in the first air flow channel 133. The elastic air pipe 150 prevents the air flow path that is the gap between the first air flow channel 133 and the second air flow channel 143 from becoming narrow by the pressing of the friction cushion 120 resulting from a passenger's load when he or she is seated.

The elastic air pipe 150 may utilize an elastic spring that is freely changed in shape and restores a changed shape to its original shape. The elastic air pipe 150 is preferably configured to keep the gap between the first air flow channel 133 and the second air flow channel 143 constant without affecting the air flow.

Meanwhile, a plurality of second air flow holes 145 is formed in the second air flow channel 143. Here, the plurality of second air flow holes 145 is formed to penetrate the friction cushion 120. The plurality of second air flow holes 145 is formed in a direction where a passenger is seated. Preferably, the second air flow holes 145 are evenly formed throughout the entire area of the friction cushion 120 to be spaced apart from each other by a predetermined distance along the second air flow channel 143. According to this embodiment, it is apparent to those skilled in the art that the size, shape and number of the second air flow holes 145 may be variously changed without being limited to specific values.

As illustrated in FIGS. 11B to 13, a plurality of second side flow holes 147a and 147b is formed in the locking part 121 provided on the friction cushion 120. The plurality of second side flow holes 147a and 147b does not circulate air, supplied through the air inlet opening 131 between the support cushion 110 and the friction cushion 120, to a portion of the friction cushion 120 in which a passenger is seated, but circulates the air to both sides of the friction cushion 120.

The plurality of second side flow holes 147a and 147b is located to be spaced apart from the second air flow channel 143. The plurality of second side flow holes 147a and 147b is formed in the locking part 121 of the friction cushion 120 to communicate with the plurality of first side flow channels 137a and 137b. The plurality of second side flow holes 147a and 147b is preferably formed in the locking part 121 at a location where the 1a side flow channel 137a and the 1b side flow channel 137b face each other.

For the convenience of description in this embodiment, the second side flow hole 147a or 147b communicating with the 1a side flow channel 137a is referred to as a '2a side flow hole 147a', and the second side flow hole 147a or 147b communicating with the 1b side flow channel 137b is referred to as a '2b side flow hole 147b'.

The plurality of 2a side flow channels 147a is arranged in a row on the locking part 121 provided on one side of the friction cushion 120 to be spaced apart from each other by a predetermined distance. The plurality of 2b side flow channels 147b is arranged in a row on the locking part 121 provided on the other side of the friction cushion 120 to be spaced apart from each other by a predetermined distance.

In the multi-hardness cushion 100 having the ventilation structure according to this embodiment, a portion on which the first and second air flow channels 133 and 143 are provided is subjected to mold block coating, so that the front of the support cushion 110 and the rear of the friction cushion 120 are formed to be smooth, thus allowing air to smoothly flow through the first and second air flow channels 133 and 143.

When the support cushion 110 and the friction cushion 120 are combined with each other, the first and second ventilation units 130 and 140 configured as described above define an air flow path as illustrated in FIGS. 12 and 13.

When the blowing unit 160 is operated, air discharged out from the blowing unit 160 is fed through the duct 161 to the air inlet opening 131. The air is introduced through the air inlet opening 131 into the air flow path defined between the first air flow channel 133 and the second air flow channel 143, flows along the air flow path and then is discharged through the plurality of second air flow holes 145, the plurality of 2a side flow holes 147a and the 2b side flow hole 147b to the outside, thus completely ventilating the friction cushion 120. That is, the present invention provides the air flow path to a portion contacting a passenger's body as well as a portion with which his or her body is not in contact, thus increasing the ventilation efficiency for the vehicle seat.

Therefore, the present invention allows perspiration generated from a passenger's body part contacting the seat to be effectively eliminated, thus preventing moisture from accumulating, and consequently providing passenger comfort.

Figure 14:
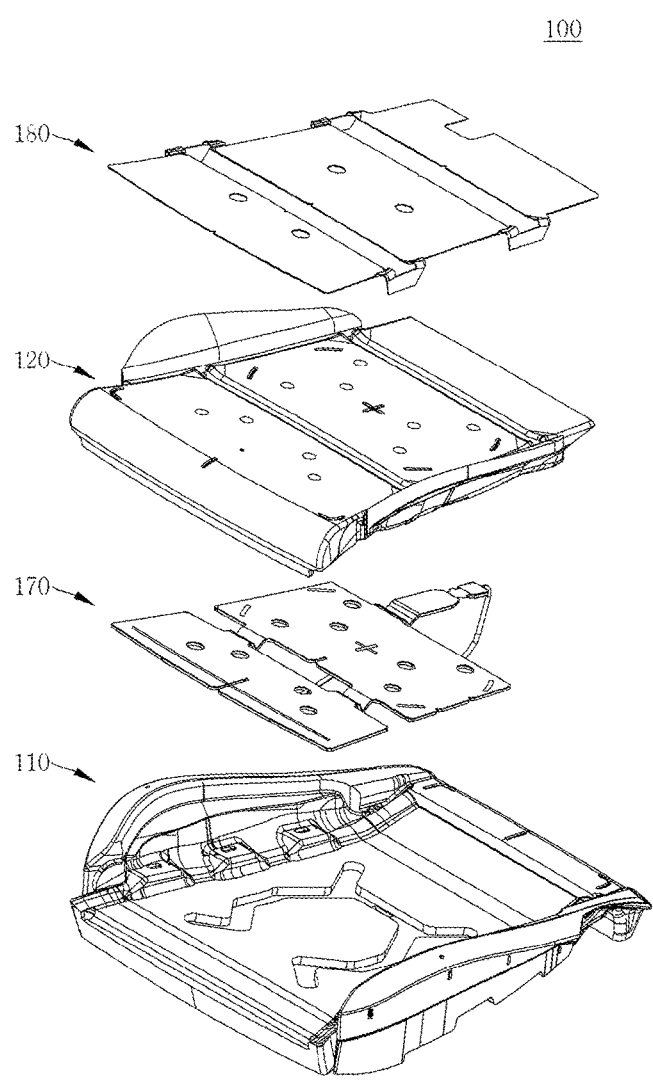
FIG. 14 is an exploded perspective view schematically illustrating a multi-hardness cushion with a ventilation structure having a seating detection sensor and a heater unit according to an embodiment of the present invention.

Meanwhile, as illustrated in FIG. 14, the seating detection sensor 170 is installed between the support cushion 110 and the friction cushion 120. The seating detection sensor 170 is a sensor to detect a passenger's seating. The seating detection sensor 170 preferably prevents the flow of the air introduced through the air inlet opening 131 into the first and second air flow channels 133 and 143 from being blocked.

The seating detection sensor 170 according to the present embodiment is installed between the support cushion 110 and the friction cushion 120, unlike the conventional structure in which the seating detection sensor is located at the uppermost surface of the vehicle seat, thus preventing the seating detection sensor 170 from becoming uneven, and thereby ensuring passenger comfort when he or she is seated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A seat cushion, comprising:
   a support cushion having an insert recess with stepped portions, wherein the stepped portions include regions that are elevated relative to other portions of the insert recess, and are formed on laterally opposing sides of the insert recess;
   a friction cushion configured to be detachably inserted into the insert recess, and having a locking part configured to be locked to each of the stepped portions in an assembled state;
   a first ventilation unit having a first air flow channel provided in the insert recess, a plurality of first side flow channels provided in each of the stepped portions, and an air inlet opening provided in the first air flow channel; and
   a second ventilation unit having a second air flow channel formed in the friction cushion and facing the first air flow channel in the assembled state, a plurality of second air flow holes leading out of the second air flow channel, and a plurality of second side flow holes formed in each of the locking parts and aligned with the first side flow channels in the assembled state,
   wherein in the assembled state, the support cushion and the friction cushion comprise the first and second ventilation units and make up the seat cushion, air is enabled to flow from the air inlet opening into the first and second air flow channels, the first side flow channels, and the second side flow holes, and air is enabled to flow from the second air flow channel into the second air flow holes.

2. The seat cushion according to claim 1, wherein
   the first air flow channel is formed in the insert recess on a front of the support cushion,
   the second air flow channel is formed on a rear of the friction cushion, and
   in the assembled state, the first and second air flow channels define an air flow path through which air introduced into the air inlet opening is enabled to flow.

3. The seat cushion according to claim 1, further comprising an elastic air pipe installed in the first air flow channel, and configured to inhibit a gap between the first and second air flow channels from narrowing in response to a compressive force being applied to the friction cushion.

4. The seat cushion according to claim 1, wherein the first and second air flow channels are formed using mold block coating.

5. The seat cushion according to claim 1, further comprising a seating detection sensor provided between the support cushion and the friction cushion, and configured to detect whether a passenger is seated on the friction cushion.

* * * * *